Mar. 6, 1923.
C. S. CRAWFORD
1,447,927
VEHICLE WHEEL
Filed Sept. 2, 1920
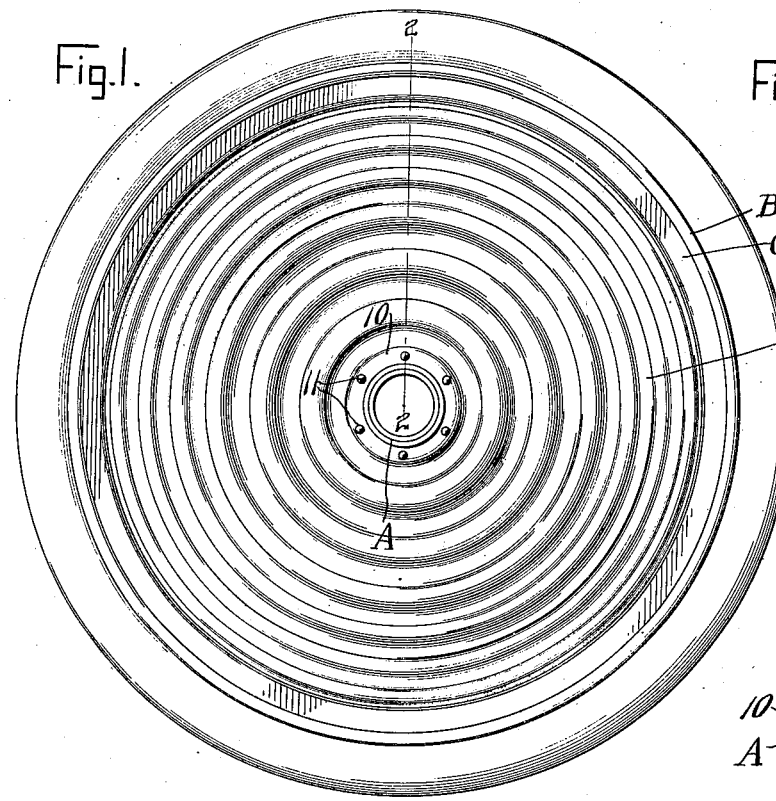
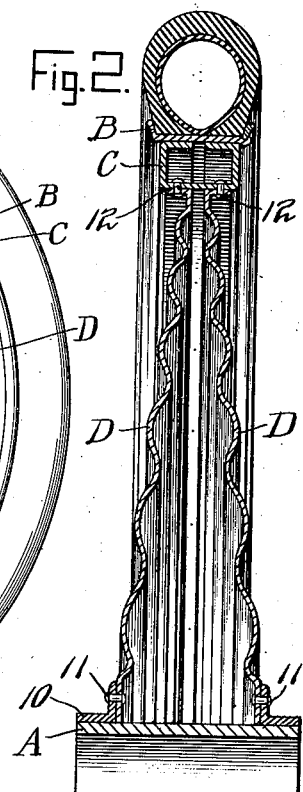
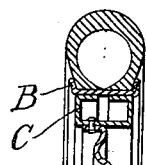
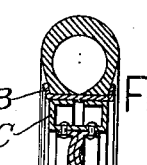
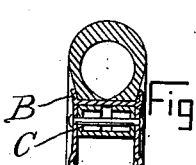
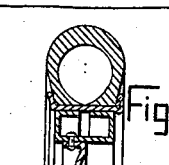
Inventor
Charles S. Crawford
By
Attorney Patented Mar. 6, 1923.

1,447,927

UNITED STATES PATENT OFFICE.

CHARLES S. CRAWFORD, OF INDIANAPOLIS, INDIANA, ASSIGNOR TO PREMIER MOTOR CORPORATION, OF INDIANAPOLIS, INDIANA, A CORPORATION OF DELAWARE.

VEHICLE WHEEL.

Application filed September 2, 1920. Serial No. 407,615.

*To all whom it may concern:*

Be it known that I, CHARLES S. CRAWFORD, a citizen of the United States, residing at Indianapolis, in the county of Marion and State of Indiana, have invented certain new and useful Improvements in Vehicle Wheels, of which the following is a specification.

The object of my said invention is to provide an all metal resilient wheel for vehicles, particularly designed for automobile use and one wherein the elements of stiffness and rigidity will not be sacrificed while securing a measure of elasticity, such as is desirable in wheels of this character, all as will be hereinafter more fully described and claimed.

Referring to the accompanying drawings, which are made a part hereof and on which similar reference characters indicate similar parts, Figure 1 is a side elevation of a vehicle wheel embodying my said invention, Figure 2, a cross section, as on the dotted line 2—2 in Figure 1, Figures 3, 4 and 5 views similar to Figure 2, but showing modified forms, Figure 6 a view similar to Figure 3 with the length of the corrugations varying in length in the reverse direction in relation to the rim and hub, and Figure 7 a view to illustrate the corrugations in spiral form.

In said drawings the portions marked A represent the hub, B and C the two parts of the rim, and D the plates constituting the connection between said hub and rim.

The hub A is of any ordinary or approved construction and requires no special description herein.

The rim consists of an outer member B and an inner member C. The outer member B may be of the type commonly used for automobile wheels of the construction using pneumatic tires and need not be further described. The inner member C consists of a hollow ring, preferably rectangular in cross section, bent up in the desired form from a sheet of metal, and secured to the member B by rivets, welding or in any other desired manner.

The plates D are in the form of disks adapted to be secured at their inner edges to the hub A by flanged rings 10 and rivets or bolts 11 and to the member C of the rim at their outer edges by rivets or bolts 12, or by welding, or in any appropriate manner. Each of said disks is formed with circumferential corrugations which corrugations may run concentric, as shown in the principal views, or spirally as shown in Figure 7, and increase in length from the rim toward the hub, or from hub to rim, in other words, the corrugations are longer toward one edge of the disk and decrease regularly until they meet the other edge. In Figure 2 I have shown the supporting web between the hub and rim as composed of two of said disks set apart one from the other, with their inner edges more widely separated than their outer edges, thus affording to the web a brace or resistance against lateral strain upon the rim of the wheel.

In Figure 3 I have shown the web composed of a single one of said disks. In Figure 4 the web is shown as composed of two of said disks placed close together and with their corrugations mating and in Figure 5 the web is shown as composed of two disks separated but parallel to each other.

In Figure 6 I show the longer corrugations adjacent to the rim and a gradual shortening of their length toward the hub, which form I desire to have considered as within the scope of my invention.

It will be understood of course that these and other modifications may be used without departing from my invention, the principal novelty in which resides in the formation of a resilient wheel with the hub and rim connected by a corrugated metal disk, the corrugations of which vary in length from the center toward the rim.

It will also be understood that while bolts and rivets are shown as connecting means, in some of the views, that the preferable method of connecting the disks to the rim will be by welding, although any well-known or appropriate method may be employed for the purpose, at either edge of the disks.

By this construction I secure a wheel of any degree of strength or rigidity required, any number of the disks necessary being employed for the purpose, the multiplicity of different resilient disks being preferable to secure strength rather than to increase the thickness of the metal, although I do not limit myself to any thickness, but propose to use whatever thickness may be found most desirable for any particular job. By varying the length of the corrugations, making the longer corrugations towards the center of the disk and decreasing their length regularly toward the rim, or the reverse, a uniform degree of resistance and resiliency is obtained throughout the diameter of the wheel and a uniform rate of deflection maintained in use.

This application is filed as a continuation of my applications No. 285,177 filed March 26, 1919.

Having thus fully described my said invention what I claim as new and desire to secure by Letters Patent, is:

A resilient wheel comprising a hub, a rim, and a multiplicity of disks interposed between said hub and rim, and separated from and unsupported by each other except by said hub and rim, said disks being formed with corrugations running around the hub and rim of successively varying lengths from the hub toward the rim.

In witness whereof, I have hereunto set my hand and seal at Indianapolis, Indiana, this 28th day of August, A. D. nineteen hundred and twenty.

CHARLES S. CRAWFORD. [L. S.]

Witnesses:
   E. W. BRADFORD,
   M. L. SHULER.